United States Patent [19]
Gertz

[11] Patent Number: 5,248,129
[45] Date of Patent: Sep. 28, 1993

[54] ENERGY ABSORBING ROADSIDE CRASH BARRIER

[75] Inventor: David C. Gertz, Citrus, Calif.

[73] Assignee: Energy Absorption Systems, Inc., Chicago, Ill.

[21] Appl. No.: 928,980

[22] Filed: Aug. 12, 1992

[51] Int. Cl.⁵ ............................................. B60R 19/34
[52] U.S. Cl. .................................... 256/13.1; 256/1; 293/133
[58] Field of Search .............. 256/13.1, 1; 293/133, 1; 188/377

[56] References Cited

U.S. PATENT DOCUMENTS

| | | |
|---|---|---|
| 1,445,655 | 3/1923 | Anderson et al. |
| 1,466,115 | 8/1923 | Butsch et al. |
| 3,751,089 | 8/1973 | Lefeuvre ............................ 293/1 |
| 3,972,390 | 8/1976 | Melton et al. ...................... 188/1 |
| 4,352,484 | 10/1982 | Gertz . |
| 4,399,980 | 8/1983 | Van Schie . |
| 4,452,431 | 6/1984 | Stephens . |
| 4,557,466 | 12/1985 | Zucker . |
| 4,635,981 | 10/1987 | Friton . |
| 4,658,941 | 4/1987 | Gottwald et al. .................. 188/377 |
| 4,711,481 | 12/1987 | Krage et al. ...................... 293/133 |
| 4,844,213 | 7/1989 | Travis ............................... 188/377 |
| 4,934,661 | 6/1990 | Denman . |

FOREIGN PATENT DOCUMENTS

WO90/14972 12/1990 PCT Int'l Appl. .
2020780 11/1979 United Kingdom ............... 188/377

Primary Examiner—Randolph A. Reese
Assistant Examiner—Christopher J. Novosad
Attorney, Agent, or Firm—Willian Brinks Olds Hofer Gilson & Lione

[57] ABSTRACT

An energy absorbing roadside crash barrier includes a scissors linkage having first and second ends. The scissors linkage is movable between an extended position and a collapsed position. A mounting element is coupled to the first end of the scissors linkage to mount the scissors linkage to a roadside obstacle. Deformable energy absorbing elements are mounted to the scissors linkage and positioned such that movement of the scissors linkage from the extended to the collapsed positions deforms the energy absorbing elements, and the energy absorbing elements thereby progressively resist collapse of the scissors linkage. A tension member is secured to the scissors linkage to apply a restraining force to hold the scissors linkage in the extended position, until forces tending to collapse the linkage exceed a pre-set range of values.

15 Claims, 5 Drawing Sheets

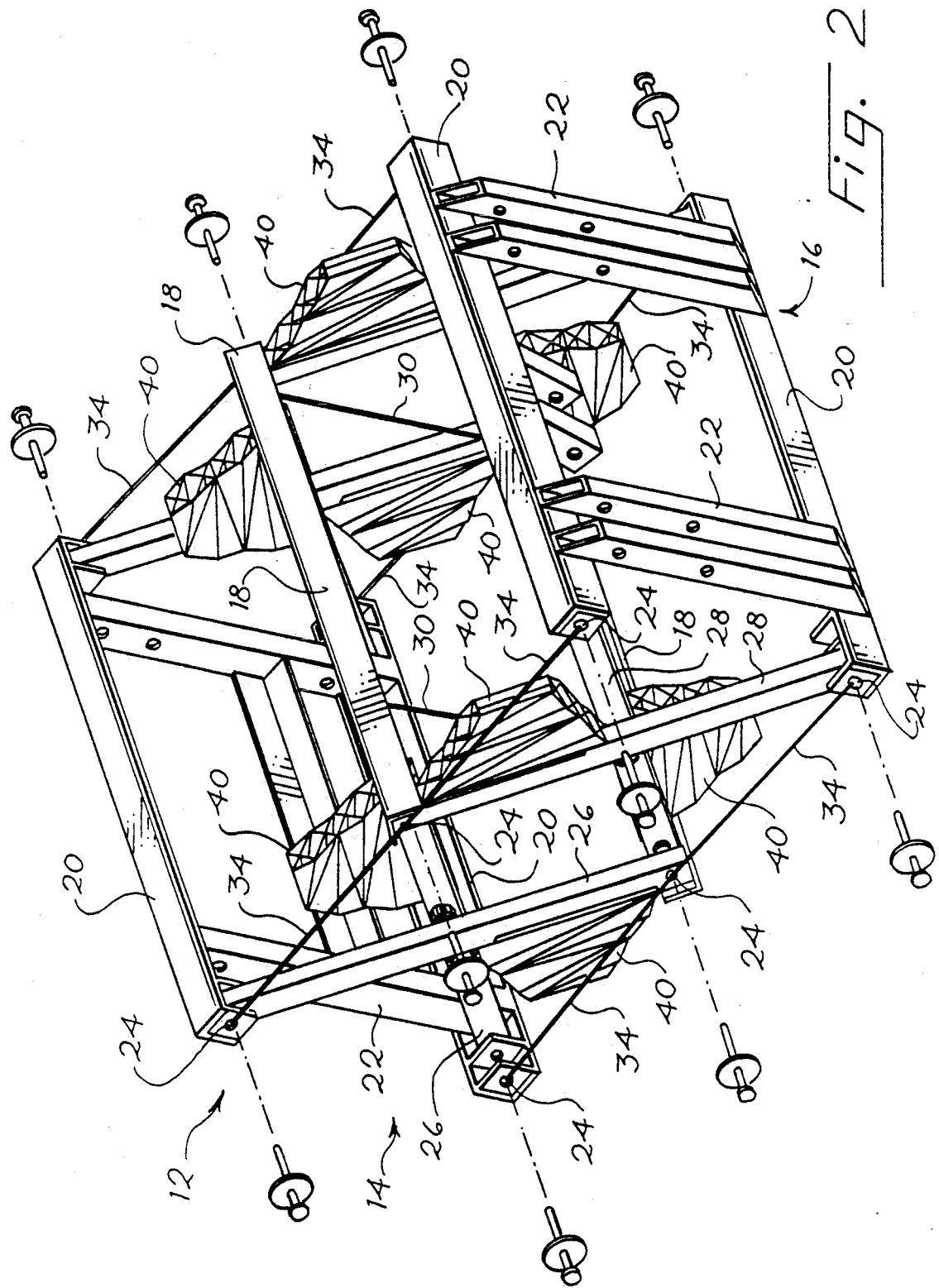

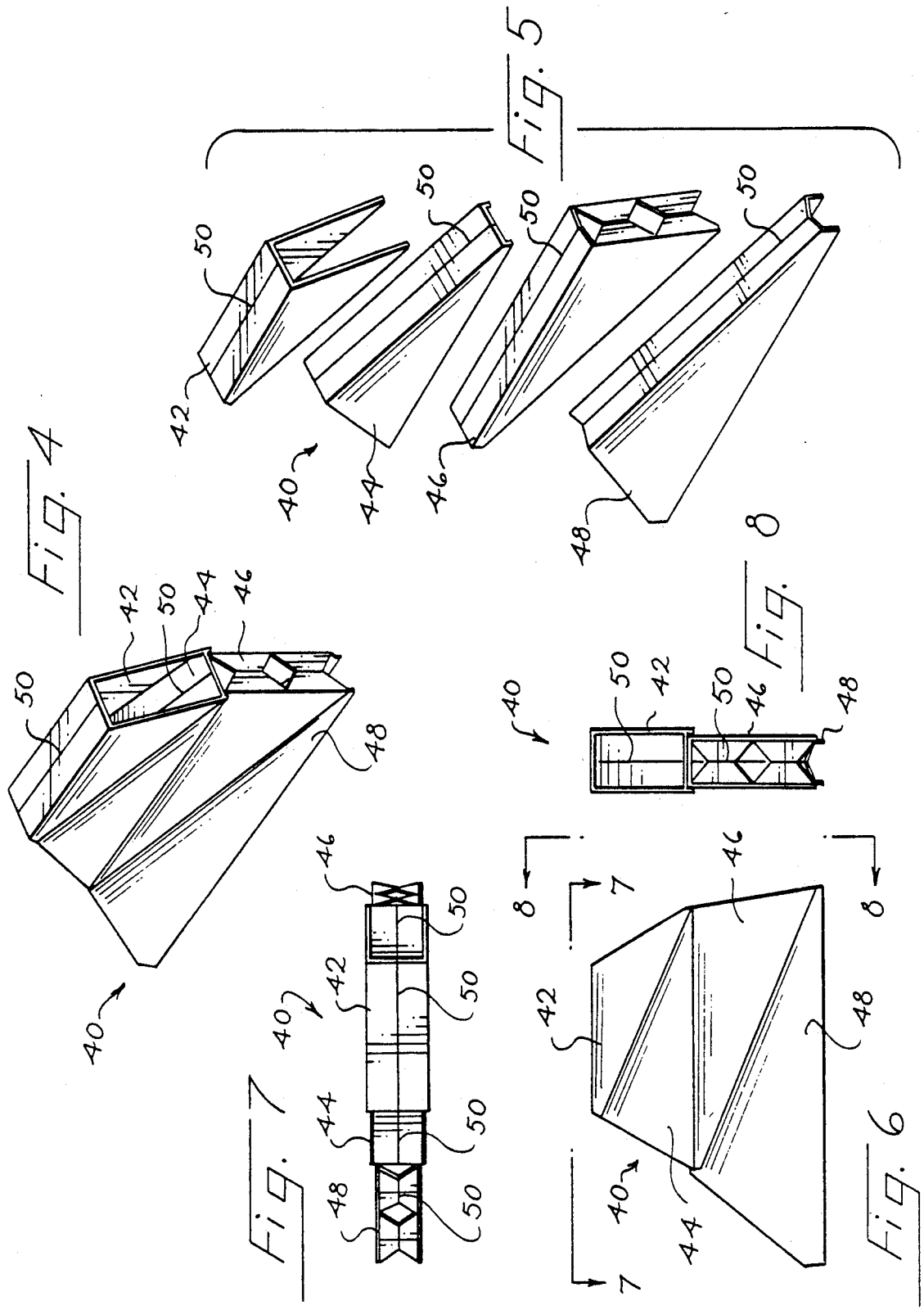

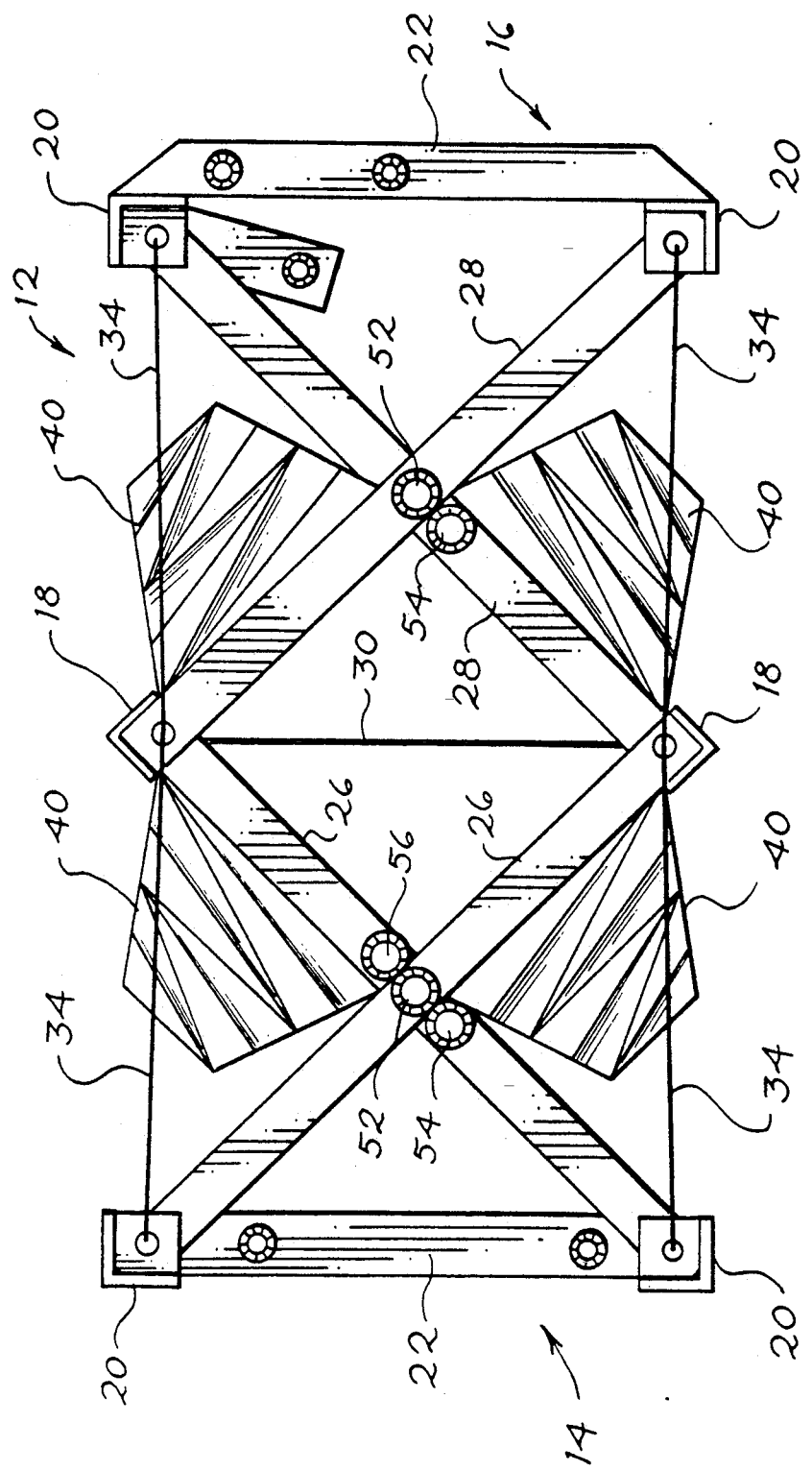

ENERGY ABSORBING ROADSIDE CRASH BARRIER

BACKGROUND OF THE INVENTION

This invention relates to an energy absorbing roadside crash barrier that operates to decelerate an impacting vehicle in a controlled manner.

Several types of roadside crash barriers have been proposed for use in decelerating vehicles. The barriers disclosed in Stechens U.S. Pat. No. 4,452,431, Gertz U.S. Pat. No. 4,352,484 and Van Schie U.S. Pat. No. 4,399,980 all employ spaced, parallel diaphragms with crushable elements interposed between the diaphragms. Another type of barrier relies on inertial forces generated when a material such as sand is accelerated in an impact. See, for example, the barriers shown in Denman U.S. Pat. No. 4,934,661 and Zucker U.S. Pat. No. 4,557,466.

A third approach is to position an energy absorbing element (a so called truck mounted attenuator) on the rear of a vehicle such as a heavy truck, and to position the vehicle in front of a work zone. Friton U.S. Pat. No. 4,635,981, Krage U.S. Pat. No. 4,711,481 and U.S. patent application Ser. No. 07/825,301 disclose various structures suitable for use for such truck mounted attenuators. In the past, these attenuators have been mounted rigidly to the back of the vehicle, and there has been a tendency for relatively light impacts to cause damage to the truck mounted attenuator that may require replacement of part or all of the attenuator.

It is an object of this invention to provide an improved roadside crash barrier which in many cases is reusable after an impact, which can be fabricated at low cost, and which allows the deceleration forces encountered by a vehicle as the barrier collapses to be selected as desired.

SUMMARY OF THE INVENTION

According to this invention, an energy absorbing roadside crash barrier is provided comprising a scissors linkage having first and second ends. The scissors linkage is moveable between an extended position and a collapsed position, and the ends are closer together in the collapsed than in the extended position. A mounting element is coupled to the first end to mount the scissors linkage to a roadside obstacle.

According to a first aspect of this invention, a plurality of deformable energy absorbing elements are mounted to the scissors linkage and positioned such that movement of the scissors linkage from the extended to the collapsed positions deforms the energy absorbing elements, and the energy absorbing elements thereby progressively resist collapse of the scissors linkage.

According to a second aspect of this invention, a tension member is secured to the scissors linkage to apply a restraining force to hold the scissors linkage in the extended position. This tension member is configured to release the scissors linkage from the restraining force when a vehicle impacts the crash barrier and applies excessive forces tending to collapse the scissors linkage.

BRIEF DESCRIPTION OF THE DRAWINGS

FIG. 2 is an isometric view of a portion of the crash barrier of FIG. 1 in the extended position.

FIG. 4 is an isometric view of one of the deformable elements of the embodiment of FIGS. 1-3.

FIG. 5 is an exploded isometric view of the deformable element of FIG. 4.

FIG. 6 is a side elevational view of the deformable element of FIG. 4.

FIG. 7 is a top view taken along line 7-7 of FIG. 6.

FIG. 8 is an end view taken along line 8—8 of FIG. 6.

FIG. 9 is a side elevational view of the portion of the crash barrier shown in FIG. 2.

DETAILED DESCRIPTION OF THE PRESENTLY PREFERRED EMBODIMENTS

Figure 1:
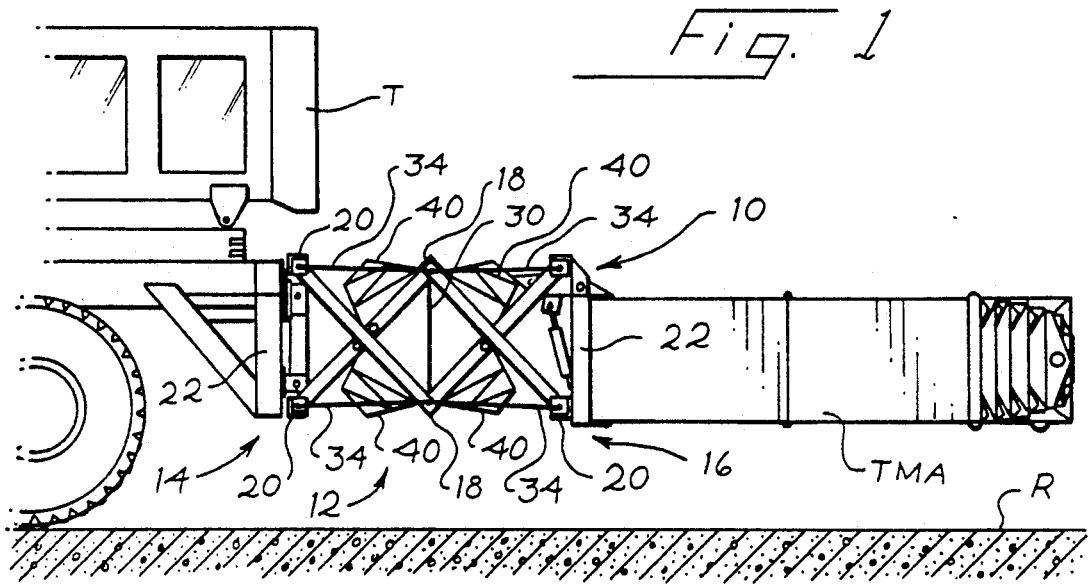
FIG. 1 is a side elevational view of an energy absorbing roadside crash barrier that incorporates a presently preferred embodiment of this invention.

Turning now to the drawings, FIG. 1 shows a side elevational view of a crash barrier 10 mounted to a truck T positioned on a roadway R. In this embodiment the crash barrier 110 includes a truck mounted attenuator TMA, which can be of any suitable type. For example, the TMA's described in U.S. Pat. Nos. 4,711,481 and 4,635,981 as well as U.S. patent application Ser. No. 07/825,301 filed Jan. 24, 1992 are all suitable. The TMA shown in FIG. 1 is that described in U.S. patent application Ser. No. 07/825,301, which is hereby incorporated by reference.

Figure 3:
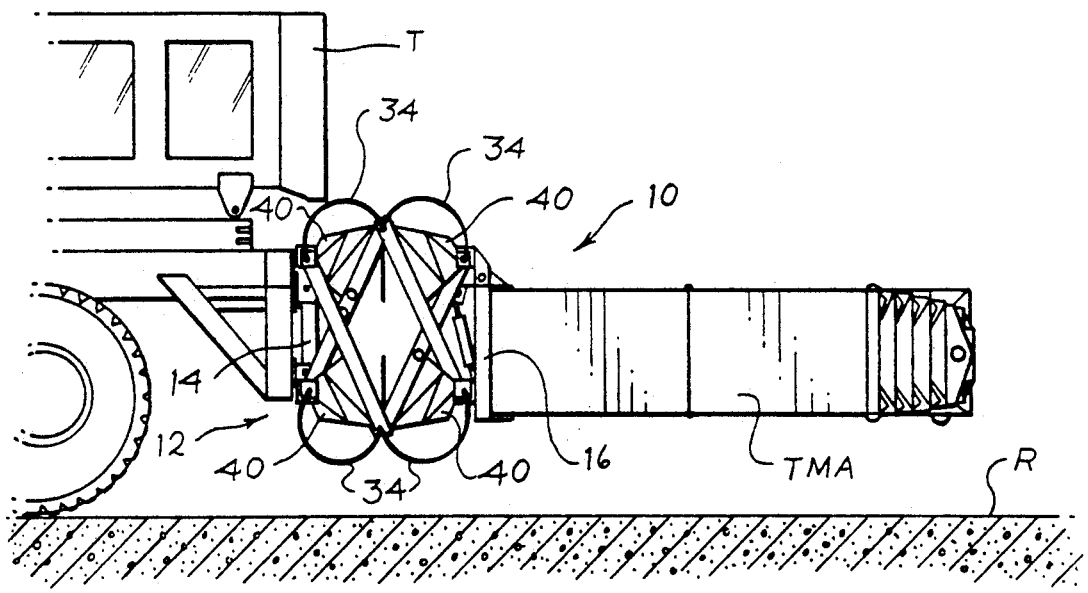
FIG. 3 is a side elevational view corresponding to FIG. 1 showing the crash barrier moved towards the collapsed position.

The TMA is mounted to the truck T by a scissors linkage 12, which is shown in the extended position in FIGS. 1 and 2 and in a partially collapsed positioned in FIG. 3. As best shown in FIG. 2, the scissors linkage 12 includes first and second spaced, parallel end brackets 14, 16 and two parallel central crossbars 18. Each of the end brackets 14, 16 is made up of upper and lower crossbars 20 which are fixedly held in position by parallel uprights 22. Each of the six crossbars 18, 20 defines a pivot axis 24 at each end, and in the extended position of FIGS. 1 and 2 these pivot axes 24 are parallel.

On each side of the scissors linkage 12 two first links 26 are pivotably interconnected between the crossbars 20 of the first end bracket 14 and the central crossbars 18. Similarly, on each side of the scissors linkage 12 two second links 28 are pivotably interconnected between the central crossbars 18 and the crossbars 20 of the second end bracket 16.

Two tension members, such as cables 30, are interconnected between the central crossbars 18, which function as securing elements, each of these cables 30 is designed to separate when the tensile forces on the respective cable 30 exceed a predetermined threshold value. Additional tension members such as cables 34 are interconnected between the pivot axes 24, as shown in FIG. 2.

Also as shown in FIG. 2, four energy absorbing elements 40 are provided on each side of the scissors linkage 12. Each of these energy absorbing elements 40 is mounted to a respective one of the links 26, 28, as for example by welding. The energy absorbing elements 40 are all identical in shape, and the structure of one of these elements 40 is shown in greater detail in FIGS. 4-8.

As best shown in FIGS. 4 and 5, each of the energy absorbing elements 40 is in this example formed of four sheet metal frames 42, 44, 46, 48. Each of the frames 42, 44, 46, 48 is generally U-shaped and is symmetrical about a midline 50. As best shown in FIGS. 7 and 8, the frames 42, 44, 46, 48 differ in width, with the frame 48 received in the frame 46, the frame 46 received in the frame 44, and the frame 44 received in the frame 42. By way of example, each of the frames 42, 44, 46, 48 can be formed of two parts that are welded together at the midline 50, and adjacent ones of the frames 42, 44, 46, 48 can be welded together. Of course other approaches such as rivets or structural adhesives can be used instead of welds. It has been found preferable to use a thicker sheet metal for the four elements 40 at the lower side of the linkage 12 than for the four elements 40 at the upper side of the linkage 12.

Figure 11:
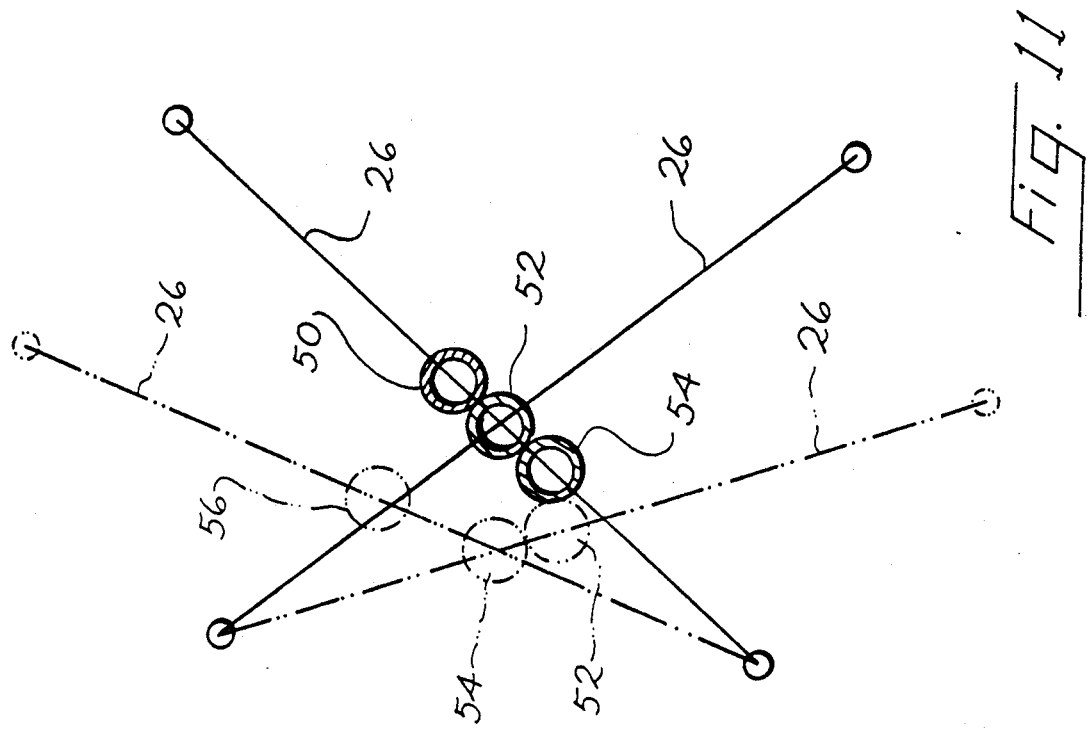
FIG. 11 is a schematic view showing additional movement of the linkage of FIG. 9 during an impact.
Figure 10:
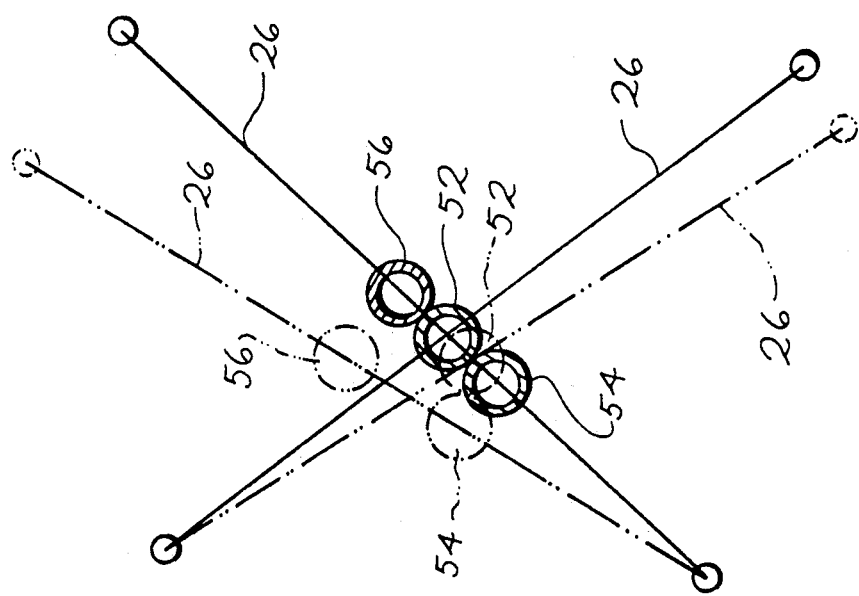
FIG. 10 is a schematic view showing movement of a portion or the linkage of FIG. 9 during an impact.

As shown in FIGS. 9-11, the scissors linkage is provided with lugs 52, 54 56 to cantilever the linkage in the extended position. The lugs 52 are centrally located on the first links 26 that extend downwardly from the crossbar 20 and on the second links 28 that extend downwardly from the crossbar 18. The lugs 54 are located beneath the lugs 52 on the first links 26 that extend upwardly from the crossbar 20 and on the second links 28 that extend upwardly from the crossbar 18. The lugs 56 are located above the lugs 52 on the first links 26 that extend upwardly from the crossbar 20.

The lugs 52, 54, 56 are cylindrical in shape and are secured, for example by welding, to the respective links 26, 28. The lugs 52 are free to slide over the lugs 54, 56 when the linkage 12 collapses axially. However, as long as the linkage 12 is extended, the lugs 52, 54, 56 brace the linkage 12 against upwardly or downwardly directed forces, and thereby help to cantilever the linkage 12.

FIGS. 10 and 11 show how the lugs 52, 54, 56 slide over one another as the linkage 12 moves from the extended position (shown in solid lines) to a partly collapsed position (shown in dotted lines in FIG. 10) to a more completely collapsed position (shown in dotted lines in FIG. 11).

As shown in FIG. 1 the first end bracket 14 is rigidly mounted to the truck T, and the second end bracket 16 is rigidly mounted to the rearward end of the TMA. The scissors linkage 12 is originally held in the extended position of FIG. 1 by the cables 30, 34 (FIG. 1). In this position the scissors linkage 12 is substantially rigid, and it cantilevers the TMA parallel to the roadway R from the back of the truck T.

When the TMA is struck by an impacting vehicle so as to move it toward the truck T (FIG. 3), forces associated with the impact increase tension on the cables 30. When this tension exceeds a predetermined range of values the cables 30 separate, thereby allowing the scissors linkage 12 to move from the extended position of FIG. 1 to a collapsed position. Once the cables 30 separate and the lugs 52, 54, 56 shift from the extended position, the scissors linkage 12 is no longer capable of cantilevering the TMA over the roadway R. However, in actual tests this has not been found to be a problem, because of the short time duration of the impact.

FIG. 3 shows an intermediate stage in the collapse of the scissors linkage 12. During the initial portion of the stroke of the scissors linkage 12 (between the positions of FIGS. 1 and FIG. 2), the scissors linkage 12 collapses freely, with the links 26, 28 pivoting about the respective pivot axes 24. In a subsequent portion of the stroke (as the scissors linkage 12 collapses beyond the point shown in FIG. 3), the links 26, 28 lever the energy absorbing elements 40 into the end brackets 14, 16, thereby deforming the energy absorbing elements 40 and providing increased deceleration forces.

The scissors linkage 12 has been designed to provide a number of important advantages. First, it is unusually simple and inexpensive to build, in part because there is no fixed pivot at an intermediate portion between adjacent ones of the links 26, 28. Instead, the links 26, 28 are arranged in a crossing configuration, wherein the crossings are free to move along the lengths of the links 26, 28, guided by the lugs 52, 54, 56, as the linkage 12 moves to the collapsed position.

Second, the linkage 12 provides an unusual combination of an initial rigidity (before the cables 30 separate) and low initial decelerating forces. This is because the energy absorbing elements 40 are not deformed during the initial portion of the stroke, and during this initial portion of the stroke decelerating forces are limited to inertial forces required to accelerate the various components of the linkage 12.

Third, the deceleration forces provided by the linkage 12 can readily be adapted for the particular application. This can be done by properly dimensioning and sizing the energy absorbing elements 40.

Fourth, the scissors linkage 12 has been designed so that in a low energy impact almost all of the elements of the scissors linkage 12 may be reused. For example, if the energy of the impact is low enough only the cables 30 will separate. Merely by replacing and retensioning the cables 30, the scissors linkage 12 can be restored for use. Preferably, the cables 30 are selected to separate before any substantial damage is done to the TMA, thereby reducing damage to the TMA in a low energy impact. In the event of a higher energy impact the energy absorbing elements 40 may be damaged, but they are designed to be replaced with the associated links 26, 28.

Of course, it should be understood that a wide range of changes and modifications can be made to the preferred embodiment discussed above. For example, the scissors linkage described above is not limited to use with TMA's. Instead, it can readily be adapted to a wide variety of roadside crash barriers. In some applications it may be preferable to provide pivots at the crossings between adjacent links, and of course a wide variety of other types of deformable elements can be substituted for those shown. If desired, the scissors linkage 12 can be arranged to be supported directly on the roadway or other support surface, and in this event the scissors linkage does not have to be sufficiently rigid to cantilever itself over the roadway. The numbers of crossings and links can be adapted for the particular application, and they can be either increased or decreased as desired. Also, a frangible element may be included in the cables 30 to allow more repeatable operation.

Simply by way of example and to define the best mode contemplated by the inventor (and not in any way to limit the scope of the following claims), the following details of construction have been found suitable for the scissors linkage 12. The linkage 12 can have a length between outer pivot axes 24 of about 48 inches in the extended position of FIG. 1. The links 26 can be formed of rectangular section steel tube having a wall thickness of ¼ inch (6.3 mm) and cross sectional dimensions of 1½ inch by 2½ inch (38 mm by 63 mm). The crossbars 20 can be formed of L-shaped steel angle having a wall thickness of ½ inch (13 mm) and cross sectional dimensions of 3½ inch by 3½ inch (89 mm by 89 mm). The cables 30, 34 may be made of a wire cable such as steel wire cable with a diameter of ⅜ inch (9.5 mm), and the cables 30 can be designed to separate in response to tensile forces greater than 5000 pounds (2300 kg). The energy absorbing elements 40 can be formed of sheet steel having a thickness of 12 gauge (for the lower elements 40) or 14 gauge (for the upper elements 40).

It is intended that the foregoing detailed description be regarded as illustrative rather than limiting, and that it be understood that it is the following claims, including all equivalents, which are intended to define the scope of this invention.

I claim:

1. An energy absorbing roadside crash barrier comprising:
    a scissors linkage having first and second ends, said scissors linkage movable between an extended position and a collapsed position, wherein the ends are closer together in the collapsed than in the extended position, said scissors linkage comprising a plurality of links pivotably mounted at respective pivot axes;
    a mounting element coupled to the first end to mount the scissors linkage to a roadside obstacle;
    a plurality of deformable energy absorbing elements mounted to the scissors linkage and positioned to contact at least some of the links intermediate the respective pivot axes as the scissors linkage moves to the collapsed position and thereby to apply resisting forces to the links intermediate the pivot axes as the scissors linkage moves to the collapsed position, such that movement of the scissors linkage from the extended to the collapsed positions deforms the energy absorbing elements and the energy absorbing elements thereby progressively resist collapse of the scissors linkage.

2. The invention of claim 1 wherein the scissors linkage moves through a stroke form the extended to the collapsed positions, and wherein the energy absorbing elements are positioned to allow for free movement of the scissors linkage in an initial part of the stroke near the extended position and to resist movement of the scissors linkage in a subsequent part of the stroke near the collapsed position.

3. The invention of claim 1 wherein selected ones of the links cross over one another at respective crossings, and wherein the links are configured to cause the crossings to move along the respective links as the scissors linkage moves form the extended to the collapsed positions.

4. The invention of claim 1 further comprising:
    a tension member secured to the scissors linkage to apply a restraining force to hold the scissors linkage in the extended position, said tension member configured to release the scissors linkage form the restraining force when a vehicle impacts the crash barrier and applies excessive forces tending to collapse the scissors linkage.

5. The invention of claim 1 further comprising an additional energy absorbing element secured to the second end of the scissors linkage.

6. An energy absorbing roadside crash barrier comprising:
    a scissors linkage having first and second ends, said scissors linkage movable between an extended position and a collapsed position, wherein the ends are closer together in the collapsed than in the extended position, said scissors linkage comprising a plurality of links arranged in a crossing configuration, and a plurality of securing elements coupled to the links and positioned such that the securing elements move away from one another as the scissors linkage moves to the collapsed position;
    a mounting element coupled to the first end to mount the scissors linkage to a roadside obstacle;
    a tension member mounted to extend between the securing elements and to apply a restraining force to hold the scissors linkage in the extended position, and tension member configured to release the securing elements form the restraining force when a vehicle impacts the crash barrier and applies excessive forces tending to collapse the scissors linkage.

7. An energy absorbing roadside crash barrier comprising:
    first and second end brackets;
    first and second crossbars;
    a plurality of first links, each having a first end pivotably connected to the first end bracket and a second end connected to a respective one of the crossbars;
    a plurality of second links, each having a first end connected to a respective one of the crossbars and a second end pivotably connected to the second end bracket;
    said first links arranged in a crossing configuration, said second links arranged in a crossing configuration, and said first and second links movable between an extended position and a collapsed position about respective pivot axes;
    a plurality of deformable energy absorbing elements mounted between respective ones of the links and at least one of the end brackets and positioned to contact at least some of the links intermediate the respective pivot axes as the first and second links move to the collapsed position and thereby to apply resisting forces to the links intermediate the pivot axes as the first and second links move to the collapsed position such that movement of the links to the collapsed position deforms the energy absorbing elements, and the energy absorbing elements thereby provide a decelerating force tending to resist movement of the links to the collapsed position.

8. The invention of claim 7 further comprising:
    a tension member secured between the crossbars to apply a restraining force to hold the links in the extended position, said tension member configured to release the links from the restraining force when a vehicle impacts the crash barrier and applies excessive forces tending to move the links to the collapsed position.

9. The invention of claim 8 further comprising additional tension members extending between selected ones of the end brackets and the crossbars to cantilever the second end bracket and the links from the first end bracket when the links are in the extended position.

10. The invention of claim 7, 8 or 9 wherein the links are configured to cause the crossings to move along the respective links as the links move from the extended to the collapsed positions.

11. The invention of claim 7, 8 or 9 wherein the links move through a stroke from the extended to the collapsed positions, and wherein the energy absorbing elements are positioned to allow free movement of the links in an initial part of the stroke near the extended position and to resist movement of the links in a subsequent part of the stroke near the collapsed position.

12. The invention of claim 7, 8 or 9 further comprising an additional energy absorbing element secured to the second end bracket.

13. The invention of claim 12 wherein the additional energy absorbing element comprises a truck mounted attenuator.

14. The invention of claim 7, 8 or 9 wherein each energy absorbing element comprises a sheet metal, space enclosing element removably secured to a respective one of the links adjacent to a respective one of the end brackets such that movement of the links toward the collapsed position levers the space enclosing elements into the respective end brackets and resulting deformation of the space enclosing elements provides a decelerating force resisting movement of the links toward the collapsed position.

15. The invention of claim 7, 8 or 9 further comprising a plurality of lugs mounted on the first links, said lugs positioned to contact one another to support the first links in the extended position, said lugs shaped to slide over one another to allow the first links to move from the extended position to the collapsed position.

* * * * *

UNITED STATES PATENT AND TRADEMARK OFFICE
CERTIFICATE OF CORRECTION

PATENT NO. : 5,248,129
DATED : September 28, 1993
INVENTOR(S) : David C. Gertz

It is certified that error appears in the above-indentified patent and that said Letters Patent is hereby corrected as shown below:

ON THE TITLE PAGE

In Column 1, under the heading "U.S. PATENT DOCUMENTS", in the first line, please delete "3/1923" and substitute therefor --2/1923--.

Under "References Cited", in Column 2, please add
--OTHER ART
U.S. Patent Application Serial No. 07/825,301 filed January 24, 1992--.

Column 1, line 11, please delete "Stechens" and substitute therefor --Stephens--.

Column 2, line 18, please delete "or" and substitute therefor --of--.

Column 2, line 55, please delete "elements,each" and substitute therefor --elements. Each--.

Column 3, line 19, after "54" please insert --,--.

UNITED STATES PATENT AND TRADEMARK OFFICE
CERTIFICATE OF CORRECTION

PATENT NO. : 5,248,129
DATED : September 28, 1993
INVENTOR(S) : David C. Gertz

It is certified that error appears in the above-indentified patent and that said Letters Patent is hereby corrected as shown below:

<u>IN THE CLAIMS</u>

Claim 2, line 2, please delete "form" and substitute therefor --from--.

Claim 3, line 5, please delete "form" and substitute therefor --from--.

Claim 4, line 5, please delete "form" and substitute therefor --from--.

Claim 6, line 18, please delete "and" and substitute therefor --said--.

Signed and Sealed this

Eighteenth Day of October, 1994

Attest:

BRUCE LEHMAN

Attesting Officer

Commissioner of Patents and Trademarks